United States Patent [19]
Ebbesson et al.

[11] 3,986,577
[45] Oct. 19, 1976

[54] DEVICE FOR DETECTING OBSTRUCTIONS IN PATH OF A VEHICLE

[76] Inventors: Bengt Ebbe Oscar Ebbesson, Jarnvagsgatan 8, 302 49 Halmstad; Åke Lennart Sjöberg, Torsdagsgrand 15, 302 53 Halmstad; Franz Barry Sjögren, PL 10911 Vilsharad, 305 90 Halmstad, all of Sweden

[22] Filed: Mar. 26, 1975

[21] Appl. No.: 562,017

[30] Foreign Application Priority Data
Apr. 11, 1974 Sweden .............................. 7404998

[52] U.S. Cl. ................................ 180/92; 200/61.43
[51] Int. Cl.² .......................................... B60T 7/12
[58] Field of Search ......................... 180/91–96; 293/4, 71 R; 200/61.43, 61.44

[56] References Cited
UNITED STATES PATENTS

| | | | |
|---|---|---|---|
| 2,444,635 | 7/1948 | Dennis | 200/61.44 X |
| 2,508,149 | 5/1950 | Eliassen | 180/91 X |
| 2,584,078 | 1/1952 | Hsi-Yu | 180/95 |
| 2,588,815 | 3/1952 | Fasolino | 180/92 |
| 2,720,275 | 10/1955 | Thayer | 180/92 |
| 3,118,984 | 1/1964 | Koenig | 200/61.43 |
| 3,277,256 | 10/1966 | Jones | 200/61.43 |
| 3,599,744 | 8/1971 | Satterfield | 180/96 |

FOREIGN PATENTS OR APPLICATIONS

| | | | |
|---|---|---|---|
| 2,125,199 | 9/1972 | France | 180/91 |
| 794,193 | 4/1958 | United Kingdom | 180/91 |

*Primary Examiner*—M. H. Wood, Jr.
*Assistant Examiner*—Terrance L. Siemens

[57] ABSTRACT

A device for detecting obstructions in the path of a vehicle which extends beyond the structure and which responds to impact in sufficient time to activate the brakes of the vehicle before the structure of the vehicle strikes the obstruction.

2 Claims, 5 Drawing Figures

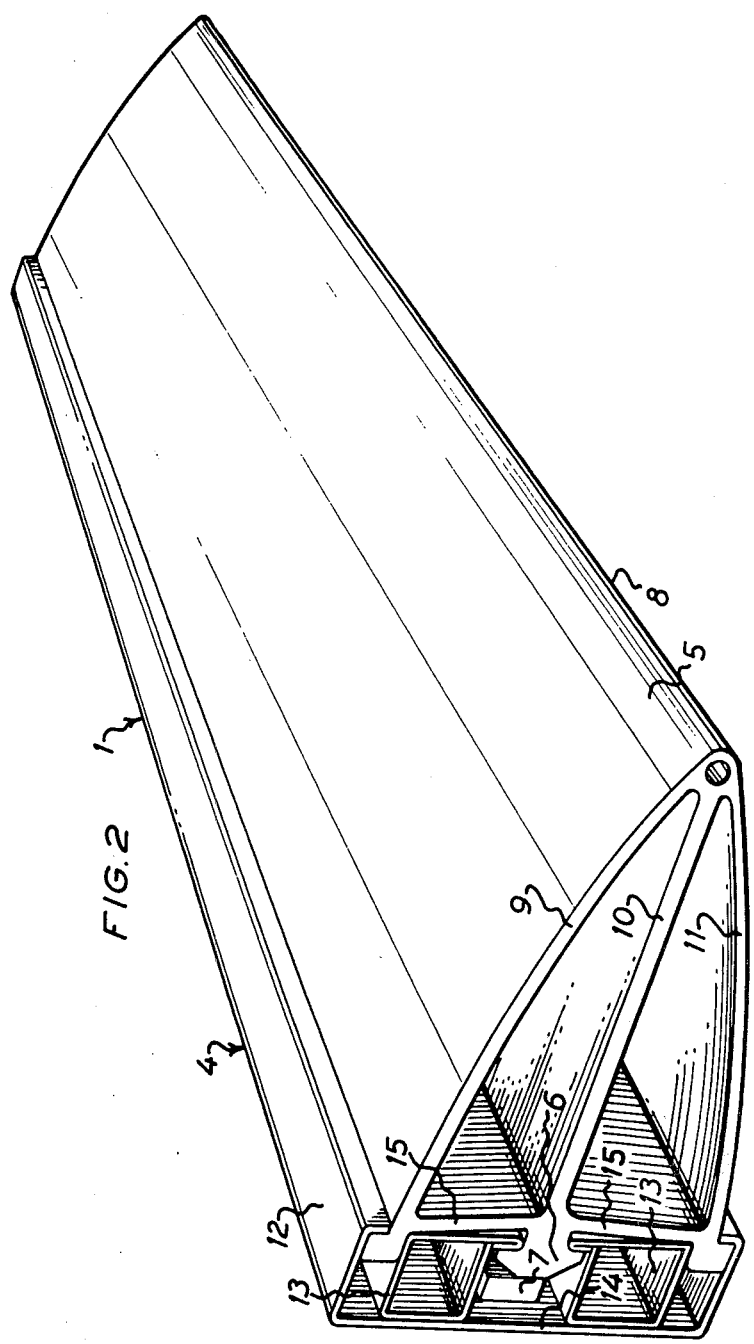

DEVICE FOR DETECTING OBSTRUCTIONS IN PATH OF A VEHICLE

The invention relates to a device in a motor vehicle for detecting an impact against an object in the path to be taken by the vehicle.

When motor vehicles, particularly vehicle combinations comprising a tractor and a semi-trailer, shall be backed for instance against a loading ramp or through a gateway, the driver's field of vision is limited and sometimes obstructed at certain dead angles. It is readily seen that it may therefore be difficult to avoid impacts against concealed objects. The driver is reduced to backing "by instinct" or on the directions given by a person, should any one be available, who is positioned beside the path to be taken by the vehicle.

These well-known difficulties in conjunction with backing operations constantly give rise to damages both to the driven vehicle or the semi-trailer thereof and to the contacted obstacle, be it a garage door, a lamp post, another vehicle or some other kind of obstacle. Serious injuries to persons also happen; children may be playing behind the vehicle or an inattentive adult may be standing behind it.

The only method, which has become known hitherto, of giving the driver an unobstructed field of vision is to install a rearwardly directed TV-camera and a monitor in the driver's cabin. However, such an arrangement is so complicated and costly that it cannot be expected to become that standard equipment which the risks associated with backing operations would in and per se warrant. It should be referred here also to the experiments of providing servo-controlled mirror systems to give the driver a clear view. Apart from the fact that such an equipment, like the TV-camera, is complicated and costly, it primarily serves to grant an unblocked view through narrow curves on forward travel.

Therefore a device is in great demand, which can prevent or lessen the effects of damages resulting primarily from backing operations with motor vehicles, particularly trucks with semitrailers. Such a device should permit being manufactured and installed at a moderate price so that it may become standard equipment in these types of motor vehicles.

The main object of the present invention is to satisfy this demand by the provision of a device which comprises detecting means protruding from the motor vehicle and adapted to strike or contact said object, and at least one switch means actuated by said detecting means when the latter contacts said object and adapted to actuate the vehicle brakes to stop the vehicle.

An embodiment of the invention is more fully described in the following with reference to the accompanying drawings in which:

FIG. 2 shows a perspective view of a preferred embodiment of the detector means, a lateral protective means having been removed for greater clarity;

Figure 3:
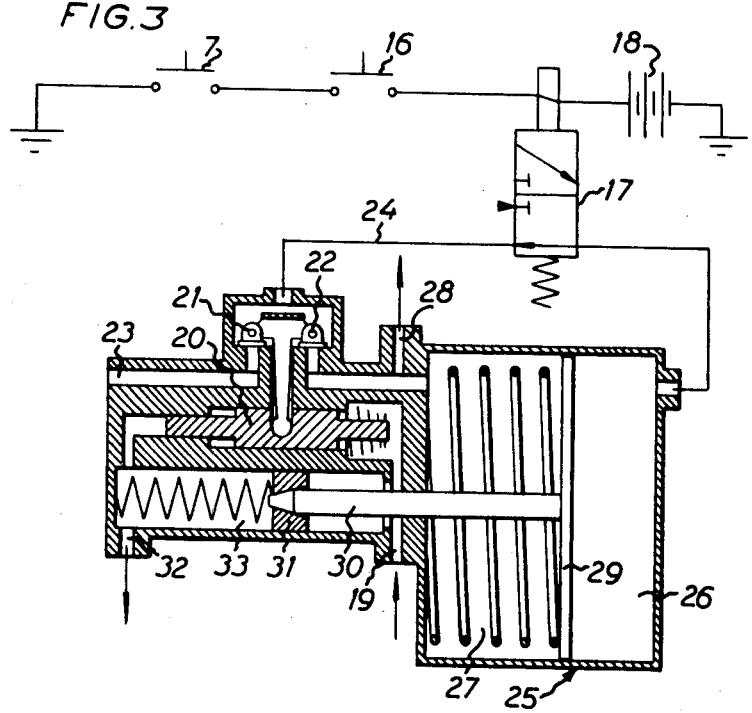
Figure 4:
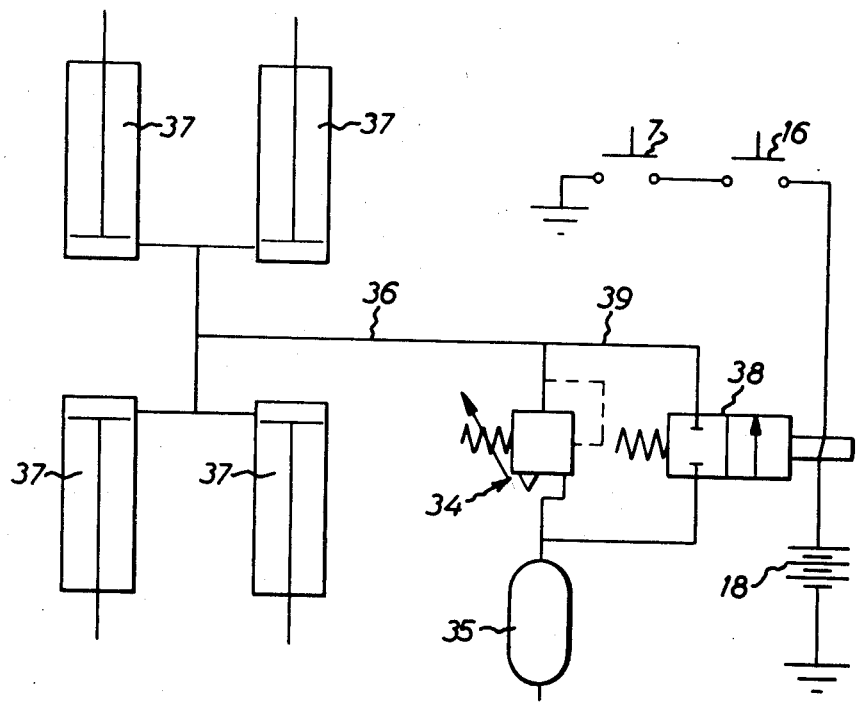

FIG. 3 diagrammatically shows the connection of the detector means to the brake system of the vehicle, said brake system being of the vacuum servo type; and FIG. 4 diagrammatically shows the connection of the detector means to a compressed-air type brake system.

Figure 1A:
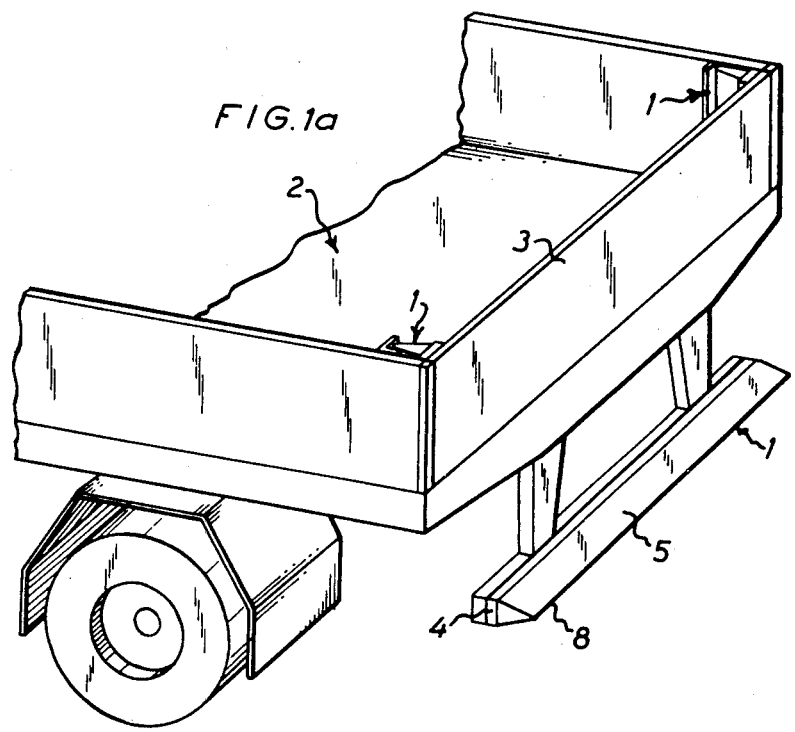
FIG. 1a shows by way of example how a detector means of the device is mounted on a truck.
Figure 1B:
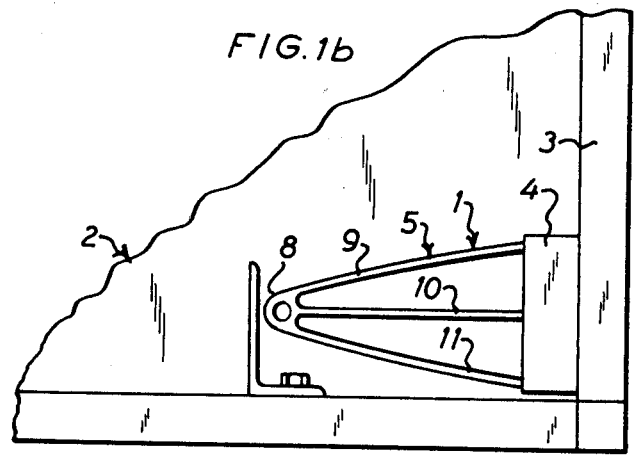
FIG. 1b shows a partial view of a corner portion of the platform body of the truck.

The method, shown in FIGS. 1a and 1b, of mounting the detector means 1 illustrates how said means is mounted to prevent a truck in backing operations to contact obstacles of moderate height on the ground. Two further means 1 of the same kind have been mounted preferably vertically on the inner side of a tailboard 3 of the vehicle platform body 2 so as to extend throughout the height of the tailboard 3. When the tailboard 3 is lowered — for instance when the vehicle is to be backed against a loading ramp — the detector means will be situated on either sides of the corners of the platform body 2. By this arrangement said vertical detector means 1 will function in the intended manner, even at possible variations in the height of the loading ramps relative to the platform body 2 of the vehicle.

The detector means (see FIG. 2) has a rigid support 4 fixedly mounted to the rear end portion of the truck, and an elongated profile 5 associated with the support, said profile being of rubber or like resilient material. The profile 5 has an actuating member 6 which, when the detector means contacts an obstacle, will actuate at least one switch means 7, preferably in the form of a microswitch, whereby a vehicle brake system for stopping the vehicle is activated.

The elongated profile 5 has an outwardly facing detector edge 8 extending throughout the length of the profile, and three support elements 9, 10, 11 extending from the detector edge to the support 4. The two outer support elements 9 and 11 are fixedly connected to the support 4 while the intermediate support element 10 is movable relative to the support 4 and carries the actuating member 6 for actuation of the switch means.

The rigid support 4 is composed of an elongated U-profile 12 of metal which is open outwardly, that is, rearwardly as seen in the direction of travel of the vehicle, and accommodates two spaced parallel metal beams 13, preferably box beams. The two outer support elements 9 and 11 of the elongated profile 5 are clamped between the U-profile and the associated metal beam 13, and the intermediate support element 10 of the profile 5 extends into the space between the metal beams. The switch means 7 is disposed on the web 14 of the U-profile 12 opposite the actuating member 6.

When the elongated profile 5 is urged inwardly, e.g. when the vehicle is backed against the loading ramp, the actuating member 6 will actuate the switch means 7. When the profile 5 has been urged so far inwardly that the walls 15 thereof bottom against the metal beams 13, the profile 5 will be elastically deformed in its outer portion, i.e. at the detector edge 8.

In the diagram shown in FIG. 3 the switch means 7 are connected in series with a contact means 16 which is caused to function when the reverse gear is engaged. An electromagnetically controlled pneumatic valve 17 is connected in the series circuit in which is also included a source of current 18, e.g. the vehicle battery. Otherwise, the diagram depicts the type of vacuum servo which is previously known and generally in use. Such a brake system functions as follows.

Upon application of the brakes, hydraulic oil at elevated pressure enters from the ordinary main cylinder of the brake system through a port 19 in a servo unit. A slide 20 is thereby moved to the left, and a valve 21 is opened at the same time as the valve 22 is kept closed. Air of atmospheric pressure flows from an inlet 23 via a connection 24 into the right portion 26 of a vacuum chamber 25. The left portion 27 is in communication via an outlet 28 with the suction system of the engine. The pressure difference between the chamber portions 27 and 26 will then actuate the piston 29 so that it moves to the left together with its piston rod 30. A piston 31 will then urge hydraulic oil at elevated pressure to the vehicle brake cylinder at the wheels via an outlet 32. As already stated, this concerns the application of the brakes. When the pressure of the hydraulic oil has been built up to the desired level and it is desired to maintain a constant brake force, i.e. no further pressure increase takes place via the port 19, the elevated pressure in a cylinder 33 will actuate the slide 20 so that it moves to the right, thus closing the valve 21, which stops the pressure increase in the chamber portion 26, and the brake force remains constant.

Activation of the brake system with the aid of the device suggested according to the invention takes place as follows.

The reverse gear is engaged, which will actuate the contact means 16 so that the circuit is closed, apart from the switch means 7. When the detector means 1 then causes the switch means 7 to close the circuit, the setting of the valve 17 changes so that the connection 24 is closed but air of atmospheric pressure flows into the chamber portion 26. This implies that maximum brake force is obtained all the time as long as the valve 17 is retained in said position. When it is desired to release the brakes, this is realized either by removal of the obstacle so that the circuit is broken at the switch means 7, or by disengagement of the reverse gear, the circuit being thus broken at the contact means 16. The brakes having been locked as a result of a contact with an obstacle in a backing operation, it is thus possible to move the vehicle forwards by merely engaging a forward gear.

The diagram of FIG. 4 shows how the detector means 1 can be connected to a compressed-air type brake system. At normal deceleration by brake application the system functions in such a way that the brake cylinders 37 by the intermediary of a pressure control valve 34 are supplied with the pressure corresponding to the desired brake force from a compressed-air container 35 via a connection 36. The valve 34 is in communication with the brake pedal.

Activation of the brake system with the aid of the device according to the invention is realized with the aid of a solenoid valve 38 which is here intended to have the same function as the abovementioned solenoid valve 17 in the vacuum servo brake system. The electric circuit is identical with that earlier described with reference to FIG. 3. When the valve 38 is opened compressed-air flows via a connection 39 past the ordinary valve 34, and full braking effect is obtained. In the same way as has been stated above when an account was given with reference to FIG. 3, the brakes are automatically released, either by removal of the obstacle or by disengagement of the reverse gear.

The above embodiment of the invention was described for purposes of illustration rather than limitation. All possible variations and modifications are understood as being included within the spirit and scope of the appended claims. The invention can be applied for example to vehicles the brake systems of which are not of the servo type. Moreover, it is fundamentally conceivable for the device according to the invention to include a separate brake system in addition to the conventional brake system of the vehicle. The detector means may be of a design other than the embodiment shown in FIG. 2. For technical reasons of manufacture the elongated profile 5 may be divided into two separate parts, an inner part and an outer part. The device can also be utilized for height indication, e.g. when the vehicle is driven through gateways, passageways etc., in which case the detector means can be placed at the highest part of the vehicle.

Of course there is nothing to prevent the device according to the invention from being disposed also at the front end portion of the vehicle, for instance in order to facilitate manoevring a passenger motor car into a narrow parking space.

What we claim and desire to secure by Letters Patent is:

1. In a device for detecting obstructions in the path of a vehicle and including detecting means protruding from a vehicle and means operable by said detecting means for activating the vehicle brakes to stop the vehicle before the vehicle strikes the obstruction, the improvement in which said detecting means comprises a rigid support fixedly mounted on the vehicle and an elongated profile composed of a resilient material associated with said support, said elongated profile comprising an outwardly extending detecting edge extending along the length of said profile having at least three support elements extending from the detecting edge inwardly toward said rigid support, the two outer support elements being fixedly connected to said rigid support and the at least one intermediate support element being movable with respect to said rigid support upon contact by an obstruction, and means mounted on the inner end of said at least one movable intermediate support element for actuating the activating means.

2. In a device as claimed in claim 1, the improvement in which said rigid support comprises an outwardly open elongated profile member and at least one beam parallel with and disposed in said open profile member, said two outer support elements of the resilient elongated profile being clamped between said open profile member and said at least one beam, said at least one intermediate support element extending into the open profile member, the means for activating the vehicle brakes being disposed on the inside of the open profile member.

* * * * *